(12) United States Patent
Yi (10) Patent No.: US 8,051,190 B2
(45) Date of Patent: Nov. 1, 2011

(54) NAK MESSAGE TRANSMISSION WITH QUICKNAK INDICATION

(75) Inventor: SeungJune Yi, Seoul (KR)

(73) Assignee: VIA Telecom Co., Ltd., George Town (KY)

( * ) Notice: Subject to any disclaimer, the term of this patent is extended or adjusted under 35 U.S.C. 154(b) by 929 days.

(21) Appl. No.: 11/622,086

(22) Filed: Jan. 11, 2007

(65) Prior Publication Data

US 2008/0170565 A1    Jul. 17, 2008

(51) Int. Cl.
   *G06F 15/16* (2006.01)
(52) U.S. Cl. ....................................... 709/230
(58) Field of Classification Search .................. 709/230
   See application file for complete search history.

(56) References Cited

U.S. PATENT DOCUMENTS

| | | | |
|---|---|---|---|
| 2003/0007466 A1* | 1/2003 | Chen | 370/328 |
| 2005/0135416 A1* | 6/2005 | Ketchum et al. | 370/469 |
| 2007/0066232 A1* | 3/2007 | Black | 455/67.11 |
| 2008/0084883 A1* | 4/2008 | Sun et al. | 370/392 |

FOREIGN PATENT DOCUMENTS

| | | |
|---|---|---|
| CN | 1859070 | 3/2009 |
| WO | WO2006007025 A2 | 1/2006 |

OTHER PUBLICATIONS

Attar, R.; Ghosh, D.; Lott, C.; Mingxi Fan; Black, P.; Rezaiifar, R.; Agashe, P., "Evolution of cdma2000 cellular networks: multicarrier EV-DO," Communications Magazine, IEEE , Feb. 2006.*
http://www.3gpp2.org/public_html/Summaries/2006_Summaries.cfm,retrieved Jun. 13, 2010.*
http://www.3gpp2.org/Public_html/specs/tsgc.cfm,retrieved Jun. 13, 2010.*
TSG-X Plenary Meeting Report, Jan. 16-20, 2005, Vancouver, BC Canada.*
Attar, R.; Ghosh, D.; Lott, C.; Mingxi Fan; Black, P.; Rezaiifar, R.; Agashe, P., "Evolution of cdma2000 cellular networks: multicarrier EV-DO," Communications Magazine, IEEE, Feb. 2006.*

* cited by examiner

*Primary Examiner* — Ajay Bhatia
(74) *Attorney, Agent, or Firm* — James W. Huffman (57) ABSTRACT

System and method for processing received packets. A QuickNak (QN) packet may be received. The QN packet may include a segmentation and reassembly (SAR) packet. The SAR packet may be delivered to a SAR receiver and it may be determined if there are missing packets, e.g., after delivery of the SAR packet. If there are missing packets, a QN indication may be generated and provided to the SAR receiver. Alternatively, the SAR receiver may receive the SAR packet with the QN indication. Accordingly, the SAR packet may be stored in a reception buffer or delivered to an upper layer, e.g., depending on current state variables. The SAR receiver may update the state variables and determine if there are missing packets. If there are missing packets, the SAR receiver may deliver an indication of the missing packets.

20 Claims, 6 Drawing Sheets

NAK MESSAGE TRANSMISSION WITH QUICKNAK INDICATION

FIELD OF THE INVENTION

The present invention relates generally to wireless application layer protocols, and more particularly to a method for processing SAR (Segmentation and Reassembly) and Quick-Nak protocol messages to remove delays in data transmission.

DESCRIPTION OF THE RELATED ART

The NxHRPD (Multi-Carrier High Rate Packet Data) system is a wireless communication system used in some wireless devices for the transmission of data. The NxHRPD protocol allows for high speed, high capacity transmission of data across devices, e.g., wirelessly. In particular, the NxHRPD protocol is designed to provide high-performance transmission and packet handling using minimal network and spectrum resources thereby lending itself to the mobile technologies where the size and stability of the network is not guaranteed.

The SAR (Segmentation and Reassembly) protocol is one of the application layer protocols of the NxHRPD (Multi-Carrier High Rate Packet Data) system. The SAR protocol provides one or more octet or packet streams with an acceptably low error rate for efficient operation of higher layer protocols. To achieve the low radio link error rate, the SAR protocol provides retransmission and duplicate detection of higher layer octets or packets.

The QN (QuickNak) protocol is also one of the application layer protocols of NxHRPD system. The QN protocol provides transmission of SAR packets through a single link. Since multiple carriers are used in an NxHRPD system, multiple links can be used, so one or more QN protocol instances could be mapped to a single SAR protocol instance. The QN protocol also provides detection of the loss of packets in each link.

Figure 1:
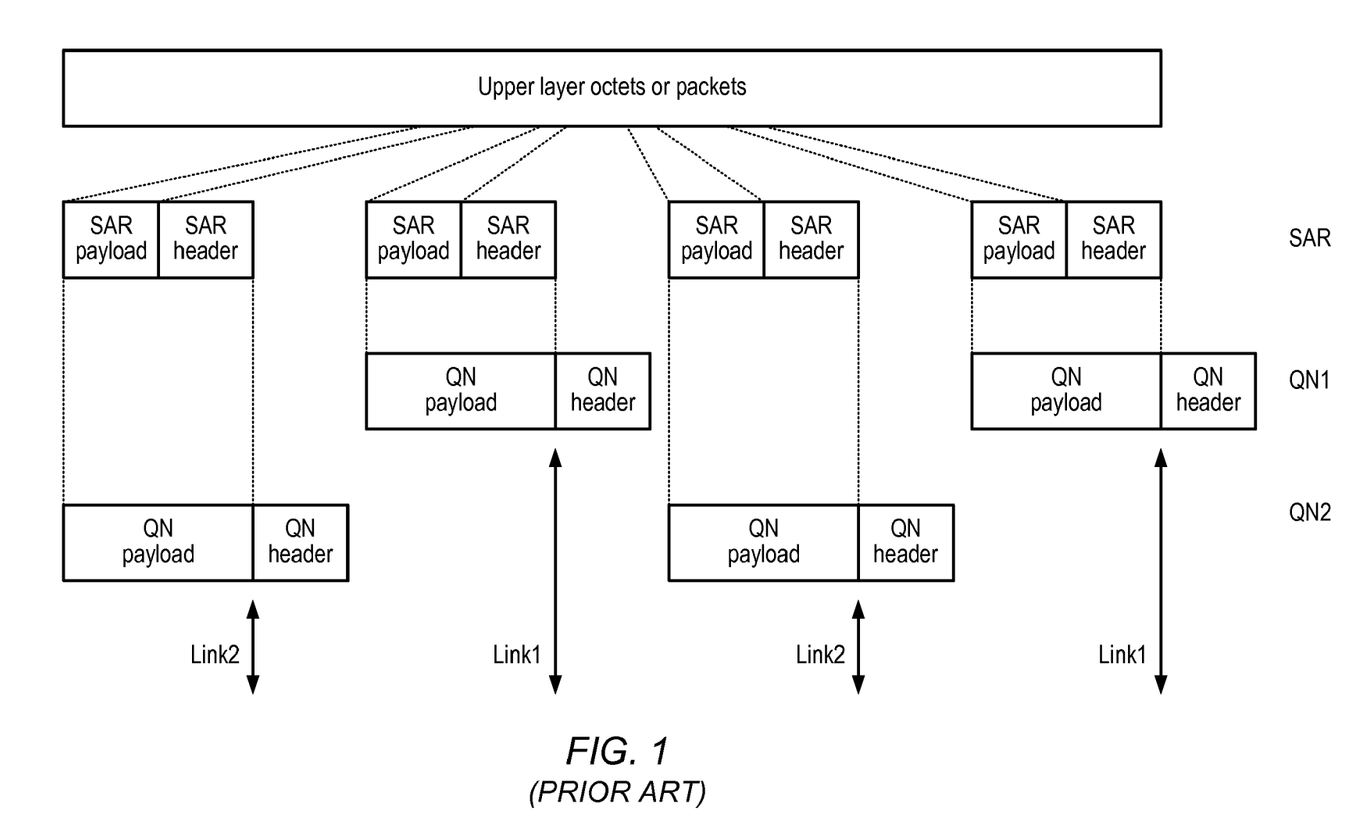
FIG. 1 illustrates the relationship between the SAR and QN protocols according to the prior art.

FIG. 1 illustrates the relationship between the SAR and QN protocols according to the prior art. In FIG. 1, a SAR instance is mapped to two QN instances, as shown. The headers of the SAR and QN protocols may contain sequence numbers, i.e. SAR sequence number (hereafter, SARseq) and QN sequence number (hereafter, QNseq), respectively. The SARseq is used to perform retransmission and duplicate detection, and the QNseq is used to detect missing packets. The SARseq and QNseq are independent of each other. Furthermore, each QN instance has its own QNseq, and the QNseq of one QN instance is independent of the QNseqs of other QN instances.

In the receiving side, each QN receiver receives QN packets from each radio link. For each QN receiver, a receiver state variable $VR_{QN}$ is maintained to detect missing QN packets on that radio link. The state variable $VR_{QN}$ contains the QNseq of the next QN packet expected to receive.

Assume that X is the QNseq of the received packet. If $X=VR_{QN}$, then there are no missing packets, so the QN receiver just passes the payload of the received packet to the SAR receiver. However, if $X>VR_{QN}$, then there are one or more missing QN packets, so the QN receiver generates a QuickNak indication and passes the QuickNak indication to the SAR receiver together with the SAR packet included in the received QN packet. After that, the QN receiver sets $VR_{QN}$ to X+1, and waits for the next QN packet.

The QN receiver also generates a QuickNak indication when the serving sector is changed. This behavior is required for the provision of loss of QN packet during serving sector change. In this case, the QN receiver delivers only the Quick-Nak indication to the SAR protocol without any SAR packets.

Figure 2:
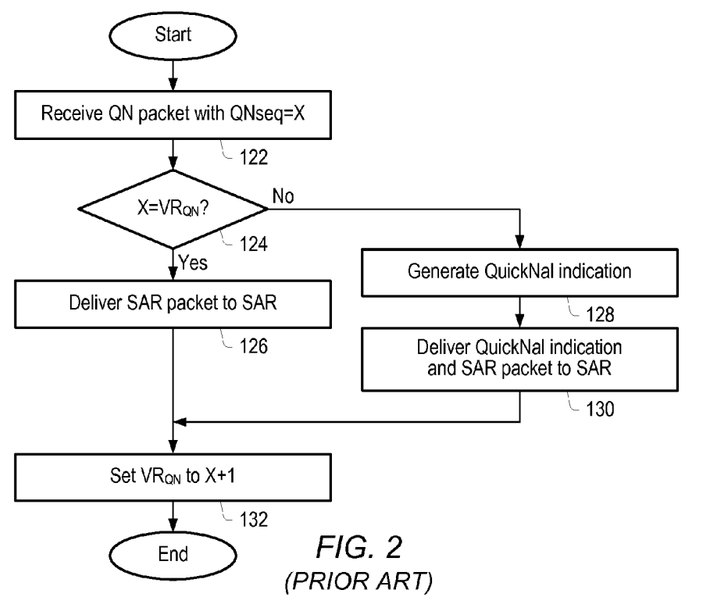
FIG. 2 illustrates the QN receiver procedure according to the prior art.

FIG. 2 illustrates the QN receiver procedure according to the prior art. As shown, at 122 a QN packet is received with QNseq=X. If $X=VR_{QN}$ as determined in 124, then in 126 the SAR packet is delivered to the SAR protocol and operation proceeds to 132. If X is not equal to $VR_{QN}$ as determined in 124, then in 128 a QuickNak indication is generated and in 130 the QuickNak indication and the SAR packet are delivered to the SAR protocol, and operation proceeds to 132. In 132, $VR_{QN}$ is set to X+1.

A SAR receiver receives SAR packets from multiple QN instances. If the SARseq of the received packet consecutively follows the SARseq of the last packet delivered to upper layer, then the SAR receiver delivers the received packet sequentially to the upper layer. However, if the SARseq is not consecutive, then the SAR receiver stores the received packet in the reception buffer with a position indicated by the SARseq. The stored packet is delivered to the upper layer only after all the previous packets are delivered to the higher layer.

For the support of this operation, each SAR receiver maintains two state variables, VN and VR. The state variable VN contains the SARseq of the first missing packet and the state variable VR is 1+the largest SARseq of the received packets. As can be understood from the definition, VN forms the lower edge of the reception buffer and VR forms the upper edge of the reception buffer. Note that VN is always less than or equal to VR. If there is no missing packet, then VN=VR, but if there are one or more missing packets, then VN<VR.

Assume that Y is the SARseq of the received packet. The received packet is either delivered to upper layer or stored in the reception buffer depending on the current values of VN, VR, and Y.

If Y<VN, the SAR receiver discards the received packet as a duplication.
  If Y=VN<VR, the SAR receiver delivers to the upper layer from the received packet up to the next missing packet or up to the packet with VR if there is no missing packet, and sets VN to the SARseq of the next missing packet or to VR if there is no missing packet.
  If VN<Y<VR, the SAR receiver stores the received packet in the reception buffer with the position indicated by Y.
  If Y=VR>VN, the SAR receiver stores the received packet in the reception buffer with the position indicated by Y, and sets VR to Y+1.
  If Y=VR=VN, the SAR receiver delivers the received packet to upper layer, and sets VR and VN to Y+1.
  If Y>VR≧VN, the SAR receiver stores the received packet in the reception buffer with the position indicated by Y, and sets VR to Y+1.

When a SAR receiver receives a QuickNak indication from one of QN receivers, the SAR receiver compares VR with VN, where VR and VN are the values at the time the SAR receiver receives the QuickNak indication. The SAR receiver then sends a Nak message to the SAR sender if VR>VN. The Nak message conveys status of all missing SAR packets from VN onwards to VR. The SAR receiver informs the SAR sender of the status of SAR packets in its reception buffer by sending the Nak message.

When a SAR receiver receives a QuickNak indication together with a SAR packet, the SAR receiver first processes the QuickNak indication and then processes the received SAR packet.

Figure 3:
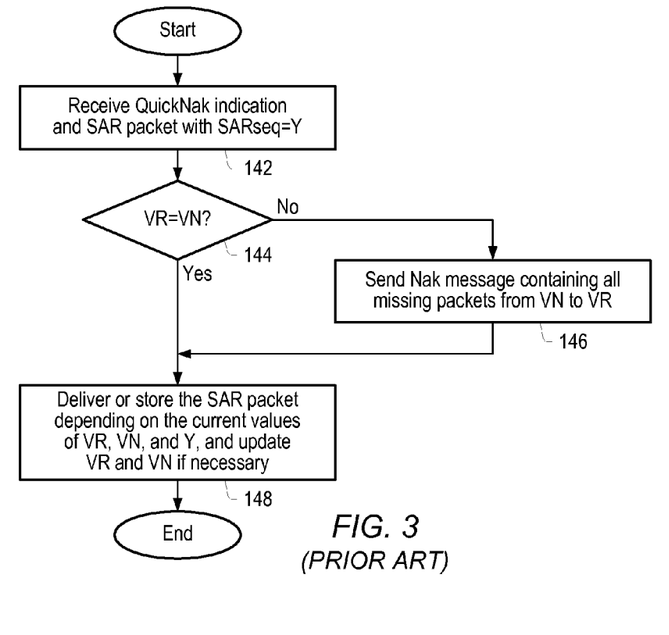
FIG. 3 illustrates the SAR receiver procedure with a Quick-Nak indication according to the prior art.

FIG. 3 illustrates the SAR receiver procedure with a Quick-Nak indication according to the prior art. As shown, in 142 the method receives a QuickNak indication and SAR packet with SARseq=Y. In 144 the method determines if VR=VN. If VR is not equal to VN, then in 146 a NAK message containing all missing packets from VN to VR is sent. Operation then proceeds to 148. If VR=VN, then operation proceeds to 148. In 148 the SAR packet is delivered or stored depending on the current values of VR, VN, and Y. In 148, the method also updates VR and VN if necessary.

Figure 4:
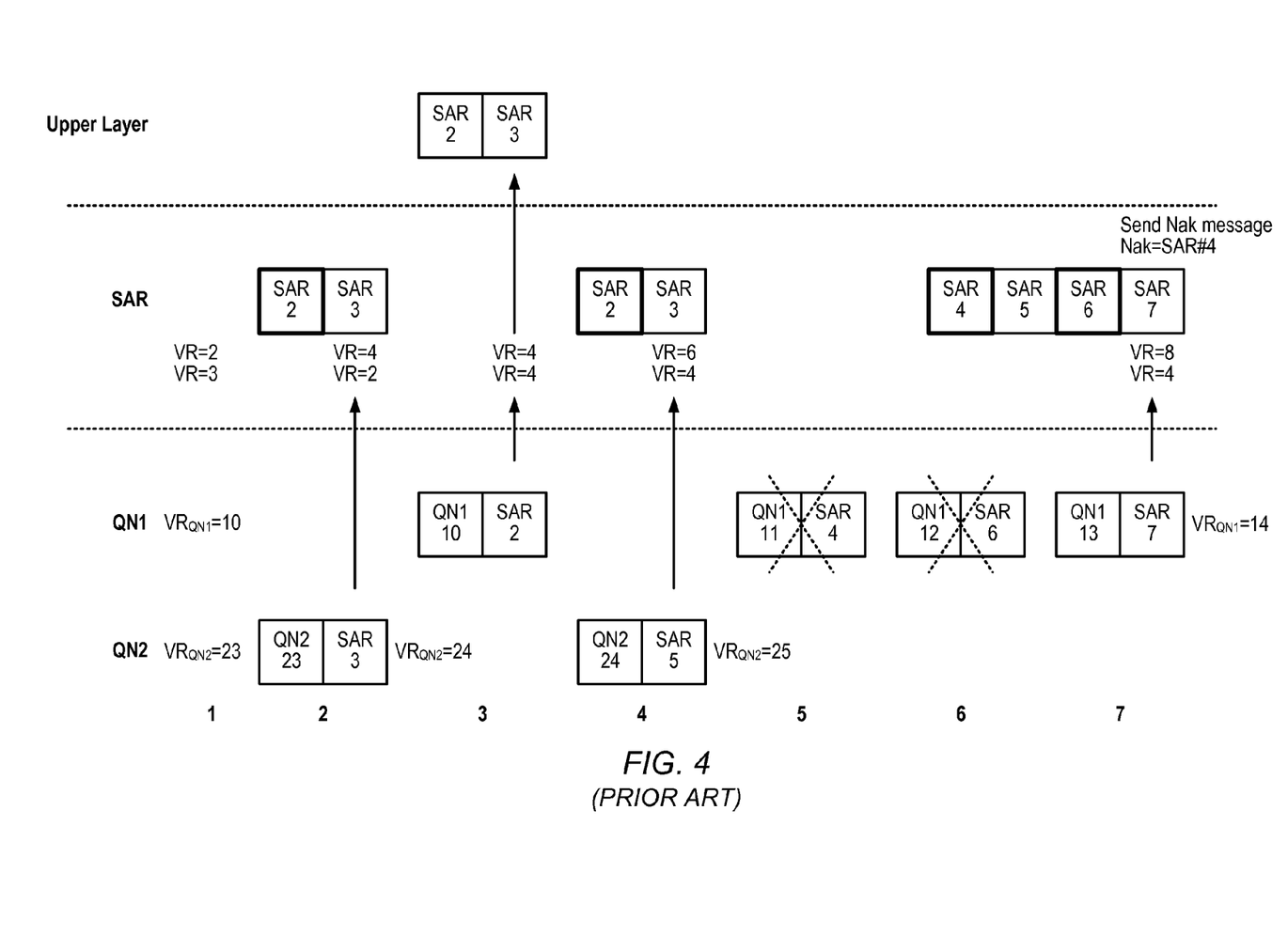
FIG. 4 illustrates example operation of SAR and QN protocols according to the prior art.

FIG. 4 illustrates example operation of SAR and QN protocols according to the prior art. FIG. 4 illustrates SAR and QN operation according to seven consecutive time periods labeled 1 to 7 from left to right. The detailed operation is described below. Here, a SAR instance is assumed to be mapped to two QN instances, QN1 and QN2.

At time 1, SAR has correctly received SAR packets up to SAR#1. At this point of time, VR=VN=2. QN1 has correctly received QN1 packets up to QN1#9, and QN2 has correctly received QN2 packets up to QN2#22. At this point of time, $VR_{QN1}=10$, and $VR_{QN2}=23$.

At time 2, QN2 receives QN2#23 which contains SAR#3. QN2 delivers SAR#3 to SAR, and updates $VR_{QN2}$ to 24. In SAR, since VN=2, SAR stores SAR#3 in the reception buffer, and updates VR to 4.

At time 3, QN1 receives QN1#10 which contains SAR#2. QN1 delivers SAR#2 to SAR, and updates $VR_{QN1}$ to 11. Since VN=2, SAR delivers SAR#2 to upper layer, and also delivers SAR#3 to upper layer. Then, SAR updates VN to 4.

At time 4, QN2 receives QN2#24 which contains SAR#5. QN2 delivers SAR#5 to SAR, and updates $VR_{QN2}$ to 25. Since VN=4, SAR stores SAR#5 in the reception buffer, and updates VR to 6.

At time 5, QN1#11 which contains SAR#4 is lost during transmission. SAR and QN protocols don't know whether the packet is lost.

At time 6, QN1#12 which contains SAR#6 is lost during transmission. SAR and QN protocols don't know whether the packet is lost.

At time 7, QN1 receives QN1#13 which contains SAR#7. Since the QNseq of the received packet is not equal to $VR_{QN1}$, QN1 generates a QuickNak indication and delivers it to SAR together with SAR#7. After that, QN1 updates $VR_{QN1}$ to 14. When SAR receives QuickNak indication and SAR#7, it first checks current VN and VR, and sends a Nak message to the SAR sender since VR=6>VN=4. The Nak message contains SAR#4, since it is the only missing packet from VN to VR. After that, since VN=4, SAR stores SAR#7 in the reception buffer, and updates VR to 8.

In the prior art, when a SAR receiver receives a QuickNak indication together with a SAR packet, it first processes the QuickNak indication, sends a Nak message if there is a missing packet, and then processes the SAR packet. Thus, the Nak message does not contain the latest status of the reception buffer. In the above example of FIG. 4, SAR#6 is not contained in the Nak message, which causes unwanted delay of the data transmission.

Therefore, an improved system and method is desired for processing data transmission protocols, such as SAR and QuickNak protocols, without introducing delays in the data transmission.

SUMMARY OF THE INVENTION

Embodiments of the present invention relate generally to wireless receiver and associated method for processing SAR and QuickNak protocol messages to remove delays in data transmission. Additionally, the wireless receiver may be involved with mobile technologies, e.g., cell phones, which may utilize SAR and QuickNak protocols. Various embodiments may apply to technologies using CDMA wireless communication networks, e.g., next generation CDMA communication networks. For example, various embodiments may apply to cdma2000, UMTS (Universal Mobile Telecommunications System), and/or WCDMA (Wireless CDMA), among others.

The method may receive a packet, e.g., a QuickNak (QN) packet, which may include at least one second packet, e.g., a segmentation and reassembly (SAR) packet. In some embodiments, the packet may have a sequence number, e.g., a QN sequence number (QNseq)=X.

Accordingly, the second packet(s) may be delivered to a receiver, e.g., a SAR receiver, e.g., after receiving the QN packet. The method may determine if there are one or more missing packets after delivering the second packet, and if there are missing packets, an indication, e.g., a QN indication, may be generated and provided to the receiver. The determination of the missing packets may be performed by comparing the sequence number with a receiver state variable, e.g., a QN state variable $VR_{QN}$, which may contain a sequence number of a next packet that is expected to be received. Additionally, the state variable may be incremented after generating the indication and providing the indication to the receiver. In various embodiments, the deliveries and generations described above may be performed by a QN receiver.

Additionally, the receiver may receive and process the second (e.g., the SAR) packet delivered by the receiver, receive the indication, and generate a message, e.g., a Nak message, indicating a status of missing packets after receiving the indication. In some embodiments, the message may include a latest status of a reception buffer including the missing packet(s).

Alternatively, the receiver, e.g., the SAR receiver, may receive a packet, e.g., a SAR packet, with an indication, e.g., a QN indication. The QN indication may indicate whether there are one or more missing packets. Correspondingly, the packet may be delivered to an upper layer or stored in a reception buffer, e.g., based on the current values of the state variables. The delivery may be performed by the receiver, e.g., the SAR receiver.

Additionally, the SAR receiver may update the state variable(s) if necessary after delivering or storing the packet. After updating the one or more state variables, the receiver may then determine if there are missing packets based on the state variables, and if there are missing packets, the receiver may send a message which indicates/includes the missing packets. In some embodiments, determining if there are one or more missing packets may include determining if a lower edge of the reception buffer is less than an upper edge of the reception buffer. For example, the packet, e.g., the SAR packet, may have a sequence number (SARseq=Y) and determining if there are one more missing packets may include comparing the sequence number with the state variable(s). In one embodiment, the state variables may include a first variable (VN) which contains a sequence number of a first missing packet and a second variable (VR) that includes the value of the largest received sequence number+1. In such embodiments, the determining may be performed by determining whether the first variable is less than the second variable.

Following the descriptions above, the receiver sending the message indicating the missing packets may include the receiver sending an indication of the missing packets between the variables VN and VR. Thus, in some embodiments, whether the receiver delivers the packet to the upper layer or stores the packet in the reception buffer may be determined based on the values of VR, VN, and/or Y.

In one embodiment, a method for processing received packets is disclosed. It comprises receiving a QN packet, which comprises a SAR packet. It also comprises delivering the SAR packet to a SAR receiver in response to said receiving, determining if there are one or more missing QN packets in response to said delivering, and generating and providing a QN indication corresponding to said missing QN packets to the SAR receiver if there is at least one missing QN packet. Moreover, it could comprise maintaining a QN state variable which indicates a QN sequence number of a next QN packet that is expected to be received.

In one embodiment, a receiver comprising a SAR and a QN receiver is disclosed. In this regards, the QN receiver, coupled to the SAR receiver further comprising input logic for receiving a QN packet, wherein the QN packet comprises a SAR packet. The QN receiver may also comprise first logic for delivering the SAR packet to the SAR receiver, second logic for determining if there are one or more missing QN packets according to the received QN packet, and third logic for generating and providing a QN indication corresponding to the one or more missing QN packets to the SAR receiver if there is at least one missing QN packet.

In one embodiment, another method for processing received packets comprises receiving a SAR packet with a QN indication and performing, according to at least one state variable, one or more of: delivering the SAR packet to an upper receiving layer, storing the SAR packet, or updating the at least one state variable. The method also comprises determining if there is one or more missing SAR packets according to the at least one state variable in response to said updating, and sending a Nak message corresponding to the one or more missing SAR packets determined as missing SAR packets.

Thus, according to various embodiments, wireless packets may be received and processed using a variety of methods.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE EMBODIMENTS

Figure 5:
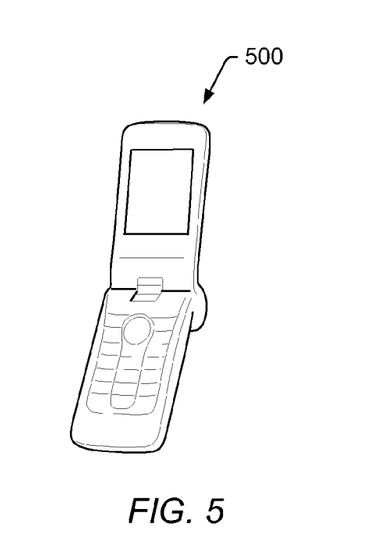
FIG. 5 illustrates a wireless transceiver according to one embodiment of the invention.

FIG. 5 illustrates a wireless transceiver according to one embodiment of the invention. As shown, the wireless transceiver may be included in a cell phone 500 or other wireless device. For example, the wireless transceiver may be included in a personal digital assistant (PDA) (e.g., a BLACK-BERRY™), a portable music player (e.g., an mp3 player, an IPOD™, etc.), a personal video player, and/or other portable device. In other words, the wireless transceiver may be included in any type of device that is capable of transmitting packets, e.g., wirelessly, according to the systems and methods described herein. Various embodiments of the invention may apply to technologies using CDMA wireless communication networks, e.g., next generation CDMA communication networks. For example, various embodiments may apply to cdma2000 and/or UMTS (Universal Mobile Telecommunications System), among others. Thus, the wireless transceiver may be included in a variety of mobile devices, e.g., the cell phone 500.

Figure 6:
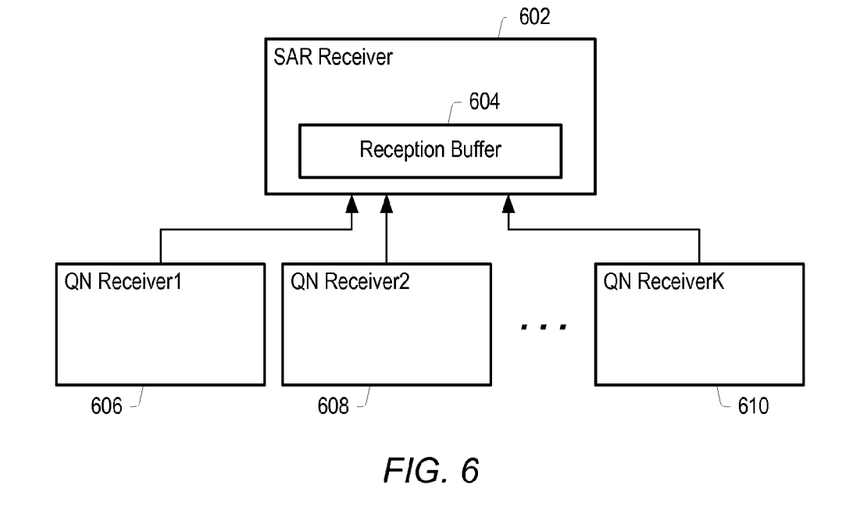
FIG. 6 is a block diagram of the wireless transceiver of FIG. 5 according to one embodiment of the invention.

FIG. 6 is a block diagram of the wireless transceiver, e.g., included in the cell phone 500 of FIG. 5. As shown, the wireless transceiver may include a plurality of QN receivers, e.g., QN receiver1 606, QN receiver2 608, . . . , QN ReceiverK 610, which may be coupled to SAR receiver 602. As also shown, the SAR receiver 602 may include a reception buffer 604 for receiving packets from the QN receivers. Thus, the SAR receiver 602 may receive packets from the plurality of QN receivers, 606, 608, . . . , 610. Further descriptions regarding the operation of the wireless transceiver, e.g., using the SAR receiver 602 and the QN receivers 606, 608, . . . , 610, are described in more detail below. Embodiments of the invention may provide at least two alternative methods to resolve the problem described above.

Figure 7:
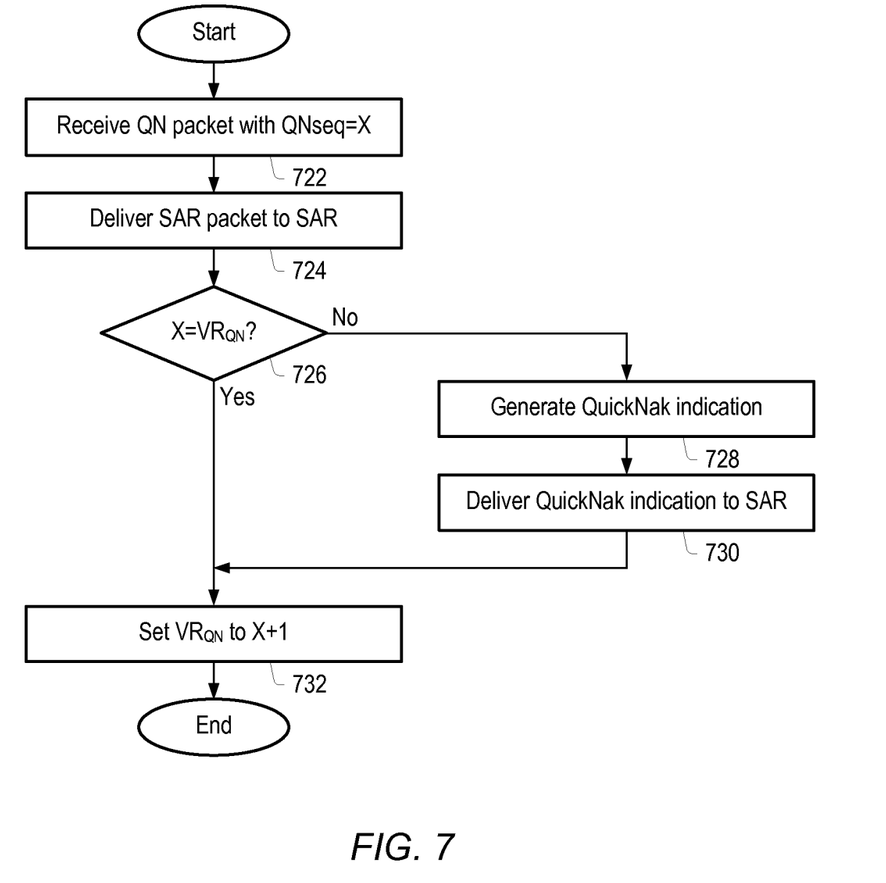
FIG. 7 illustrates operation of the QN receiver method according to a first embodiment of the invention.

FIG. 7 illustrates one embodiment of a first method, referred to as a QN procedure. The QN procedure of FIG. 7 may be performed by one or more QN receivers, e.g., QN receivers 606, 608, . . . , 610 as shown in the FIG. 6.

As shown, in 722 the method may receive a QuickNak (QN) packet, wherein the QN packet comprises a segmentation and reassembly (SAR) packet. The QN packet may have a QN sequence number (QNseq)=X.

In 724 the method delivers the SAR packet (that was contained in the QN packet) to a SAR receiver.

In 726, after delivering the SAR packet in 724, the method may determine if there are one or more missing QN packets. This may be performed by comparing X with a QN receiver state variable $VR_{QN}$, wherein $VR_{QN}$ contains a QNseq of a next QN packet that is expected to be received. More particularly, the method may determine if there are one or more missing packets by comparing X to $VR_{QN}$. If X is equal to $VR_{QN}$ then there are no missing packets. However, if X is not equal to $VR_{QN}$ then there are missing packets.

If there is at least one missing packet as determined in 726, then in 128 the method may generate a QuickNak indication and in 730 provides the QuickNak indication to the SAR receiver. The method then advances to 732. If there are no missing packets as determined in 726, then operation proceeds directly to 732.

In 732 the method sets $VR_{QN}$ to X+1. For example, in the case where at least one missing packet is determined in 126, the method sets $VR_{QN}$ to X+1 after generating the QuickNak indication in 728 and providing the QuickNak indication to the SAR receiver in 730. Alternatively, in the case where no missing packets are determined in 726, the method sets $VR_{QN}$ to X+1.

In summary, when a QN receiver receives a QN packet with QNseq of X, it first delivers the SAR packet contained in the QN packet to SAR receiver, and then compares X with $VR_{QN}$. If X>$VR_{QN}$, the QN receiver generates a QuickNak indication and passes it to the SAR receiver. After that, the QN receiver sets $VR_{QN}$ to X+1, and waits for the next packet.

Figure 8:
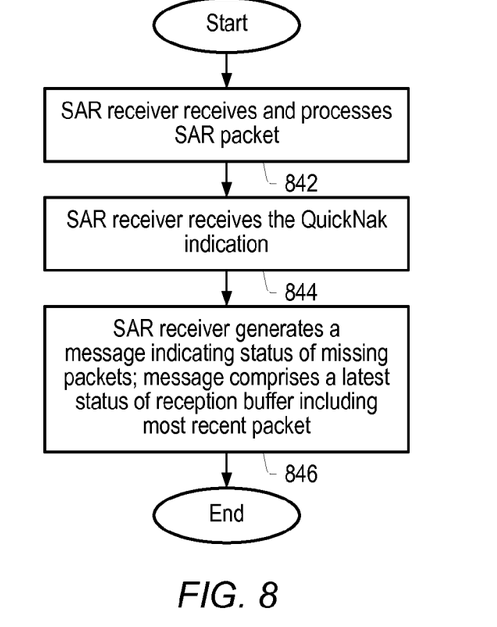
FIG. 8 illustrates operation of a SAR receiver operating in response to the QN receiver of FIG. 7 according to the first embodiment of the invention.

FIG. 8 illustrates operation of a SAR receiver in response to the method described in FIG. 7. As shown, in 742 the SAR receiver receives and processes the SAR packet transmitted by the QN receiver in 724 of FIG. 7. The SAR receiver may process the SAR packet by extracting information from the SAR packet, e.g., using the header information included in the SAR packet. In some embodiments, the information may be stored in one or more packets included in the SAR packet. Thus, the SAR packet may be processed by extracting information in the SAR packet according to header information also included in the SAR packet. Alternatively, or additionally, the SAR packet may be processed by determining the current packet number, e.g., as determined from the SAR packet, and/or the expected packet number, e.g., according to state variables, e.g., stored by the SAR receiver. Thus, the SAR packet may be processed via a variety of methods.

In 844 the SAR receiver receives the QuickNak indication transmitted by the QN receiver in 830 of FIG. 7. Thus, the SAR receiver receives the QuickNak indication after the SAR receiver receives and processes the SAR packet.

In 846 the SAR receiver generates a message (such as a Nak message) indicating a status of missing packets. It is noted that the SAR receiver generates the message in 846 after the SAR receiver receives the QuickNak indication in 844. The message generated in 846 comprises a latest status of the SAR receiver's reception buffer, including the at least one missing packet determined in 826 of FIG. 7.

With the methods described in FIGS. 7 and 8, a SAR receiver always receives a SAR packet and a QuickNak indication sequentially when there is a missing packet. Since the SAR packet is received and processed first, a Nak message after receiving QuickNak indication contains the latest status of reception buffer including the very last missing SAR packet.

Figure 9:
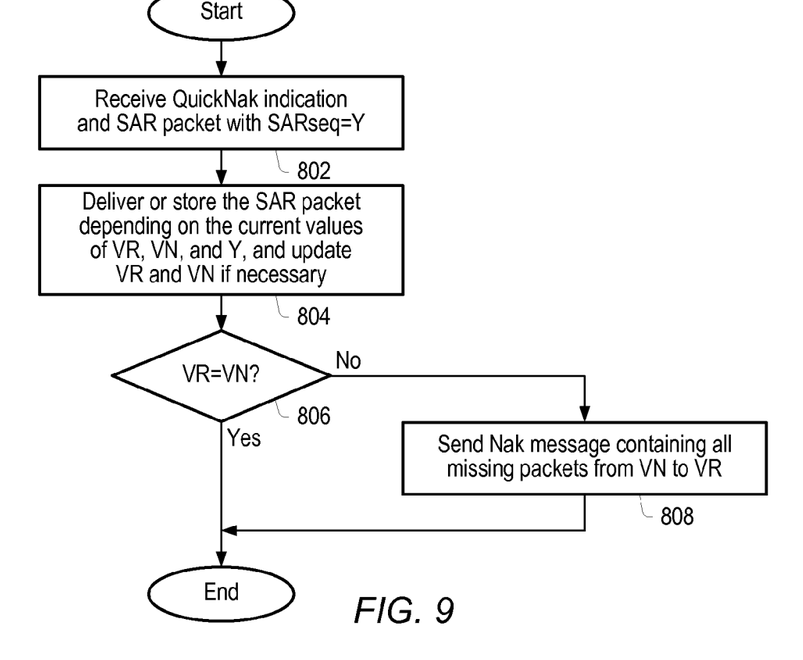
FIG. 9 illustrates operation of the SAR receiver method with QuickNak indication according to a second embodiment of the invention.

FIG. 9 illustrates one embodiment of a second method, referred to as a SAR procedure. The SAR procedure of FIG. 9 may be implemented in a SAR receiver. The method of FIG. 9 may be performed independently of the methods of FIGS. 7 and 8.

As shown, in 902 a segmentation and reassembly (SAR) receiver receives a SAR packet with a QuickNak indication. The SAR packet may have a sequence number (SARseq)=Y. The SAR packet may be received to a reception buffer.

In 904 the SAR receiver may perform one of: 1) delivering the SAR packet to an upper layer; or 2) storing the SAR packet in a reception buffer. The method may perform either 1) or 2) dependent on current values of one or more state variables. In one embodiment, the state variables may be VR, VN, and/or Y. In 904 the SAR receiver may further update the one or more state variables if necessary. For example, in 904 the SAR receiver may update VR and VN, if necessary.

In 906, after delivering or storing the SAR packet in 904, the method determines if there are one or more missing packets. This may be performed by comparing VR and VN. For example, if VR is equal to VN then there may be no missing packets. However, if VR is not equal to VN, then there may be missing packets.

If there is at least one missing packet (e.g., as determined in 906), then in 908 the method generates a Nak message, comprising all missing packets from VN to VR. In some embodiments, the Nak message may be an air-interface message transmitted from the SAR receiver to the SAR sender. If there are no missing packets as determined in 206, then operation completes.

Therefore, in summary, when a SAR receiver receives a SAR packet with SARs eq of Y together with a QuickNak indication, it first processes the SAR packet. The SAR packet is either delivered to upper layer or stored in the reception buffer depending on the current values of VR, VN, and Y. After processing the SAR packet, the SAR receiver updates VR and/or VN if necessary. Then, the SAR receiver compares VR with VN. If VR>VN, then the SAR receiver sends a Nak message including all the missing packets from VN to VR.

According to the methods described herein, in at least some embodiments a Nak message sent from a SAR receiver always contains the latest status of the reception buffer. This can help a SAR sender to decide quickly whether to retransmit a packet or not. As a result, the delay in retransmission will be reduced. Note that the particular protocol names used herein are exemplary only, and other protocol names could be used. For example, the QN protocol could be referred to as a lower layer protocol and the SAR protocol could be referred to as an upper layer protocol based on QN protocol according to some embodiments. Alternatively, the lower layer protocol could be named as a first protocol as well as the upper layer protocol could be named as a second protocol.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

The invention claimed is:

1. A method for processing received packets, comprising:
   a QuickNak (QN) receiver receiving a QN packet, wherein the QN packet comprises a segmentation and reassembly (SAR) packet;
   the QN receiver delivering the SAR packet to a SAR receiver in response to said receiving;
   the QN receiver determining if there are one or more missing QN packets in response to said delivering; and
   the QN receiver generating and providing a QN indication corresponding to said missing QN packets to the SAR receiver if there is at least one missing QN packet.

2. The method of claim 1, further comprising:
   maintaining a QN state variable which indicates a QN sequence number of a next QN packet that is expected to be received.

3. The method of claim 2, wherein said determining comprises comparing said QN state variable with the QN sequence number of the received QN packet.

4. The method of claim 2, wherein said maintaining comprises setting the QN state variable to the QN sequence number of a next QN packet of the last missing QN packet.

5. The method of claim 2, wherein said maintaining the QN state variable is in response to said generating and providing.

6. The method of claim 1, further comprising:
   generating, by the SAR receiver, a message indicating a status of missing SAR packets in response to the QN indication being provided to the SAR receiver.

7. The method of claim 1, further comprising:
generating, by the SAR receiver, a Nak message in response to the QN indication being provided to the SAR receiver.

8. A receiver, comprising:
a SAR receiver; and
a QN receiver, coupled to the SAR receiver, further comprising:
input logic for receiving a QN packet, wherein the QN packet comprises a segmentation and reassembly (SAR) packet;
first logic for delivering the SAR packet to the SAR receiver upon reception of the QN packet;
second logic for determining if there are one or more missing QN packets according to the received QN packet; and
third logic for generating and providing a QN indication corresponding to the one or more missing QN packets to the SAR receiver if there is at least one missing QN packet, wherein said providing the QN indication is performed after said delivering the SAR packet.

9. The receiver of claim 8, wherein the QN receiver further comprising:
fourth logic for maintaining a QN state variable which indicates a QN sequence number of a next QN packet that is expected to be received.

10. The receiver of claim 9, wherein the second logic is configured to compare said QN state variable with the QN sequence number of the received QN packet for determining if there is one or more missing QN packets.

11. The receiver of claim 9, wherein the fourth logic is configured to set the QN state variable to the QN sequence number of a next QN packet of the last missing QN packet.

12. The receiver of claim 9, wherein the fourth logic is configured to maintain the QN state variable in response to the QN indication is provided to the SAR receiver.

13. The receiver of claim 8, wherein the SAR receiver comprises:
input logic for receiving the SAR packet and the QN indication;
processing logic for processing the received SAR packet prior to receiving the QN indication; and
message logic for generating a message indicating a status of missing SAR packets in response to the QN indication being provided to the SAR receiver.

14. The receiver of claim 13, wherein the SAR receiver comprises:
a reception buffer for storing information regarding the missing QN packets, wherein the message comprises a latest status of the reception buffer having information of the at least one missing SAR packet.

15. The receiver of claim 13, wherein the message logic comprises generating a Nak message in response to the QN indication being provided to the SAR receiver.

16. A method for processing received packets, comprising:
receiving a SAR packet with a QN indication;
performing, according to at least one state variable, one or more of:
delivering the SAR packet to an upper receiving layer;
storing the SAR packet; or
updating the at least one state variable;
after said performing, determining if there is one or more missing SAR packets according to the at least one state variable in response to said updating; and
sending a Nak message corresponding to the one or more missing SAR packets determined as missing SAR packets.

17. The method of claim 16,
wherein the SAR packet has a sequence number,
wherein said determining comprises comparing the sequence number of the received SAR packet with the one or more state variables.

18. The method of claim 17,
wherein the one or more state variables comprises a first variable indicating the sequence number of a first missing SAR packet and a second variable indicating a sum of one and the sequence number of a latest received SAR packet,
wherein said determining comprises determining if the first variable is less than the second variable.

19. The method of claim 18, wherein the Nak message corresponds to the one of missing SAR packets having a sequence number from the first variable to the second variable.

20. The method of claim 16,
wherein the SAR packet has a sequence number,
wherein the one or more state variables comprises a first variable indicating the sequence number of a first missing SAR packet and a second variable indicating a sum of one and the sequence number of a latest received SAR packet,
wherein the combination of said performing is according to the sequence number, the first variable, and the second variable.

* * * * *